United States Patent [19]

Salisbury

[11] 4,048,105

[45] Sept. 13, 1977

[54] HIGH DENSITY URETHANE FOAM FOR RIM

[75] Inventor: Wayne C. Salisbury, Middleton, N.H.

[73] Assignee: McCord Corporation, Detroit, Mich.

[21] Appl. No.: 642,559

[22] Filed: Dec. 19, 1975

[51] Int. Cl.$^2$ ................................................ C08J 9/00
[52] U.S. Cl. ........................ 260/2.5 AC; 260/2.5 AM
[58] Field of Search .................. 260/2.5 AM, 2.5 AP, 260/77.5 AM

[56] References Cited

U.S. PATENT DOCUMENTS

| | | | |
|---|---|---|---|
| 3,575,896 | 4/1971 | Khan | 260/2.5 AM |
| 3,890,255 | 6/1975 | van Leuwen et al. | 260/77.5 AM X |
| 3,897,410 | 7/1975 | Olstowski et al. | 260/77.5 AM X |
| 3,929,730 | 12/1975 | Graefe et al. | 260/77.5 AM X |

*Primary Examiner*—Lewis T. Jacobs
*Attorney, Agent, or Firm*—McGlynn and Milton

[57] ABSTRACT

A highly reactive urethane foam for RIM to produce thin-sectioned automobile trim components having good high temperature sag performance is a quasi prepolymer system in which the polyol side is based on a relatively high molecular weight polyol combined with a known highly reactive unhindered aromatic polyamine chain extender/cross linker and with conventional short chain diols/triol extenders/cross linkers and catalysts.

6 Claims, No Drawings

HIGH DENSITY URETHANE FOAM FOR RIM

INTRODUCTION

This invention pertains to the manufacture of thin-sectioned automobile trim components, such as bumper fascia, by injection molding of a urethane foam composition. It is more particularly concerned with an improved urethane foam composition of the prepolymer type that is especially suitable for reaction injection molding and produces a product that has surprisingly good high and low temperature properties and an excellent relatively nonporous skin.

A recent advance in the field of urethane technology has been the development of reaction injection molding, or RIM, systems such as ones using high pressure, multi-stream, high velocity impingement to effect essentially instantaneous mixing. As used herein, RIM means a system wherein the time from initial mixing of the urethane foam ingredients to injection in the mold cavity is less than 0.01 seconds.

In order to secure a good performance at high temperature without distortion, the polyol side of the urethane foam prepolymer system of this invention uses as a polymer backbone a polyol that is relatively long chain; that is, it has a molecular weight in the range of preferably 3000-6000, functionality of 2-3, and an equivalent weight of 1500-3000. These polyols have a high primary hydroxyl content. In the range of 50 to 90 percent of the hydroxyl groups are primary groups. The reaction rates of such polyols are not too fast, but in the present composition an exceptionally fast, highly reactive, unhindered aromatic polyamine chain extender/cross linker having one amino group per aromatic nucleus is used to overcome this problem in addition to which, as the amine is aromatic, it contributes to the foam's high temperature stability and resistance to sag. The bisurea linkage from the primary amine is known to have high temperature stability.

These aromatic amines are known and have the formula:

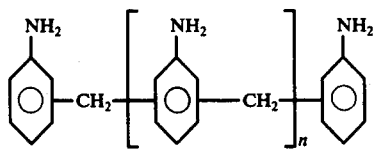

Wherein $n$ has a value in the range of 0.1 to 0.7. The use and advantage of such amines in foam systems are discussed in U.S. Pat. Nos. 3,575,896 and 3,681,291.

The RIM foam system of this invention, in order to tailor in specific properties, uses other recognized ingredients in the polyol blend such as alkylene diol and triol cross linker/extenders, organometal catalysts, alkylene amine catalysts, carbon black, blowing agents, and the like. The use of conventional cross linker/extenders such as butane diol, ethylene glycol, pentanediol, etc., without the aromatic polyamine does not significantly change the high temperature performance of the product.

The prepolymer side is quite important in the development of the foam properties. It is a quasi prepolymer of a polyoxyalkylene diol and an MDI, i.e., methylene bis (4-phenyl isocyanate), type of diisocyanate. It is known that where only one isocyanate is present per aromatic nucleus the urethane is more stable as compared to a TDI (tolulenediisocyanate) having two groups per nucleus. In addition, if a TDI is used, the elongation of the product can drop as much as 50 percent. One of the advantages of this invention is that a crude MDI can be used, thus permitting quite significant savings. The prepolymer used is characterized in part by its quite high free isocyanate content, or FNCO, of preferably 20 to 27 weight percent.

One skilled in the art will recognize the foam formulations of this invention as being so extremely reactive as not to be processable in conventional processing equipment. Commercially available equipment that can be used to process these compositions include: Krauss-Maffei MK-164 PU40/PU80, Cannon H100-2, and Henneke HK-1000 and KK-500 metering machines.

Being so highly reactive, the foam systems of this invention dramatically reduce mold-occupancy times. For a similar system without the aromatic polyamine, in-mold cure times may be in the order of 2–3 minutes whereas with this invention times of 45 to 60 seconds are easily attainable. The cure times secured with the formulations of this invention are not possible in complex moldings using standard urethane catalysts such as tert-amines and organometallics.

DESCRIPTION

The following table presents an example of the formulation of this invention and gives the ranges of the proportions of ingredients that can be used in the practice of this invention.

Table 1

| Polyol Blend | (parts by weight) Broad Range | Preferred Range | Example A |
| --- | --- | --- | --- |
| Long chain polyol (1) | 50 to 100 | 70 to 90 | 84.92 (1a) |
| Short chain alkane diol/triol #1 (2) | 0 to 25 (2) | 10 to 20 | 16.13 (1,4 butane diol) |
| Short chain alkane diol/triol #2 (2) | 0 to 25 (2) | 0.10 to 20 | 0.92 (ethylene glycol) |
| Aromatic polyamine (3) | 1 to 6 | 3 to 4 | 3.52 (3) |
| Catalyst #(4) | 0.1 to 3.0 | 0.8 to 1.6 (alkylene amine) | 1.20 (DABCO) |
| Catalyst #(5) | 0.01 to 0.05 | 0.015 to 0.030 (organometallic) | 0.025 (dibutyl tin dilaurate) |
| Carbon black | 0 to 40 | 0.01 to 1.0 | 0.020 |
| Gaseous blowing agent (6) | 0 to 10 | 3 to 8 | 7.0 (trichlorofluoromethane) |
| Water (7) | 0 to 0.15 | 0 to 0.08 | 0.04 |
| Equivalent weight Prepolymer | — | — | 232 ± 5 |
| Index* | 98 to 106 | 100 to 104 | 100 |
| FMCO % (8) | 20 to 27 | 22 to 24 | 23 |
| Foam Properties: | | | |
| Free Rise Density, pcf | 11 ± 2 | | |
| Molded Density | 55 pcf, min | | |
| Tensile, psi | 2000 min | | |
| Elongation, % | 250 min | | |

Table 1-continued

| Polyol Blend | (parts by weight) | | Example A |
|---|---|---|---|
| | Broad Range | Preferred Range | |
| Tear, Die "C", pli | 400 min | | |
| Hardness (Shore A) | 90 min | | |
| Flexural Modulus, at RT, psi | 19,000 min | | |
| Sag, inches at 250° F | 0.75 max | | |

*Index is the ratio of prepolymer-NCO groups used to polyol blend reactive hydrogen groups or equivalent (usually —OH) × 100
pcf = pounds per cubic foot
pli = pounds per linear inch
psi = pounds per square inch
(1) A polyol having a molecular weight in the range of 3000–6000, a functionality of 2-3, and an equivalent weight of 1500–3000 such as high molecular weight polyether diols, triols, and blends. Mobay's E-9207 was used in the example. Examples of other commercially available materials are: Jefferson 6500, Union Carbide NIAX 3128, Wyandotte P-38Q, Olin Poly GX 442 and Dow 4701.
(2) The alkane diols and triols can have molecular weights of 62 to 250. Examples of such cross linkers/extenders are diethylene glycol, pentane diol, trimethyol propane, and 1, 2, 6 hexane triol.
(3) The aromatic amine has the formula previously given. In the example, n has a value of 0.3. It was Curithane 103, sold by Upjohn Co., Polymer Chemicals Division.
(4) Examples of suitable known amine catalysts are: DABCO(triethylene diamine), N-ethylmorpholine, and TMBDA (tetramethyl-butane diamine).
(5) Examples of suitable known organometallic catalysts are:dibutyltin dilaurate and diacetate, stannous octoate and tinmercaptides.
(6) Blowing agents that can be used are: methylenechloride,nitrogen, and DuPOnt's Freon 11 and Freon 12.
(7) Water may be used but may give rise to post blowing andpaintability problems.
(8) The prepolymer used in the example was 91.3 parts byweight of Mobay's Mondur PF. Upjohn's PAPI 901-Polymeric can alsobe used. The prepolymer is made from a diol as in (2) above andan aromatic diisocyanate.

Notes:

(1) A polyol having a molecular weight in the range of 3000–6000, a functionality of 2-3, and an equivalent weight of 1500–3000 such as high molecular weight polyether diols, triols, and blends. Mobay's E-9207 was used in the example. Examples of other commercially available materials are: Jefferson 6500, Union Carbide NIAX 3128, Wyandotte P-380, Olin Poly GX 442 and Dow 4701.

(2) The alkane diols and triols can have molecular weights of 62 to 250. Examples of such cross linkers/extenders are diethylene glycol, pentane diol, trimethyol propane, and 1, 2, 6 hexane triol.

(3) The aromatic amine has the formula previously given. In the example, n has a value of 0.3. It was Curithane 103, sold by Upjohn Co., Polymer Chemicals Division.

(4) Examples of suitable known amine catalysts are: DABCO (triethylene diamine), N-ethylmorpholine, and TMBDA (tetramethylbutane diamine).

(5) Examples of suitable known organometallic catalysts are: dibutyltin dilaurate and diacetate, stannous octoate and tin mercaptides.

(6) Blowing agents that can be used are: methylenechloride, nitrogen, and DuPont's Freon 11 and Freon 12.

(7) Water may be used but may give rise to post blowing and paintability problems.

(8) The prepolymer used in the example was 91.3 parts by weight of Mobay's Mondur PF. Upjohn's PAPI 901-Polymeric can also be used. The prepolymer is made from a diol as in (2) above and an aromatic diisocyanate.

Examples of commercially available aromatic diisocyanates are: Upjohn's Isonate 125M (pure MDI) and Isonate 143L ("liquid" MDI).

The example of the table is used to manufacture 1975 Vega 2 + 2 uppers and lowers using a Krauss-Maffei MK-164K mixhead. The impingement pressure was 2100 ± 50 psi; the throughput was 150 ± 2 pounds per minute and the shot time was 1.8 seconds minimum - 4.0 seconds maximum. The theoretical time for any one increment of foam from mixng to injection in the mold cavity was less than 0.01 seconds. The foam ingredients were maintained at about 90° F, the mold temperature was about 130° F, and the time to the mold surfaces as required. The demolded part was given a post cure at ambient temperature for 15 minutes. Thereafter, the part was primed, baked 15 minutes at 250° F, and painted.

Other automobile exterior trim parts that have been made with this formulation are: 1976 Chevrolet Monza front upper fascia, Corvette fascia, and 1976 Ford Mark V sight shield.

As a comparison, some Vega bumper fascia were manufactured commercially from a foam composition that was substantially identical to the one in the example except that the Curithane 103 was not used with the amount of isocyanate being less so that the Index was the same. This comparative foam has the same free rise density, molded density, tensile and tear, but its elongation was 300 percent, its flexural modulus was only 12,500 psi, and its sag was 1.4 max.

The example of the table was repeated with some variations in the proportions of the ingredients, as follows (parts by weight):

| | B | C | D | E | F |
|---|---|---|---|---|---|
| Long chain polyol | | | 84.9 | | |
| Short chain alkane diol #1 | | | 16.13 | | |
| Short chain alkane diol #2 | | | 0.93 | | |
| DABCO | | | 0.4 | | |
| Dibutyl tin dilaurate | | | 0.025 | | |
| Carbon black | | | 0.02 | | |
| Blowing agent | | | 7.0 | | |
| Aromatic polyamine | 3.525 | 4.0 | 4.5 | 5.0 | 5.5 |
| Prepolymer amount* | 86 | 87 | 88 | 88.9 | 89.8 |

*weight amount for a theoretical Index of 100; prepolymerFNCO was 23 percent.

All of these compositions were satisfactory for the purposes of this invention.

What is claimed is:

1. A polyurethane foam prepared by intimately mixing

A. a polyol blend comprising (parts by weight):

| long chain polyol | 50 to 100 |
|---|---|
| cross linker/extender | 0 to 25 |
| aromatic polyamine | 1 to 6 |
| alkylene amine catalyst | 0.01 to 3.0 |
| organometal catalyst | 0.01 to 0.05 | with

B. a quasi prepolymer of an alkane diol and an aromatic diisocyanate, said quasi prepolymer having a free NCO in the range of 20 to 27 percent;

wherein:

said long chain polyol has a molecular weight in the range of 3000 to 6000, a functionality in the range of 2 to 3, and an equivalent weight of 1500 to 3000:
said crosslinker/extender has a molecular weight in the range of 62 to 250 and is selected from the group consisting of alkane diols and triols;
said aromatic polyamine has the formula

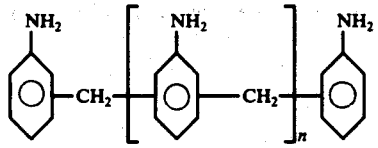

and n has the value in the range of 0.1 to 0.7, and said polyol blend and said quasi prepolymer are admixed to an Index in the range of 98 to 106.

2. The foam of claim 1 wherein said polyol blend also contains in the range of 0.10 to 20 parts by weight of a second alkane diol in the range of 0.01 to 1.0 parts by weight carbon black and in the range of 3 to 8 parts by weight blowing agent, and said mixing is effected in a RIM system.

3. A polyurethane foam prepared by intimately mixing in a RIM system and reacting
A. a polyol blend comprising (parts by weight):

| long chain polyol | 70 to 90 |
| [alkane diol/triol #1 | 10 to 20] |
| [alkane diol/triol #2 | 10 to 20] |
| aromatic polyamine | 3 to 4 |
| alkylene amine catalyst | 0.8 to 1.6 |
| organometal catalyst | 0.015 to 0.030 |
| carbon black | 0.01 to 1.0 |
| gaseous blowing agent | 3 to 8 | and a crosslinker/extender blend comprising in the range of 10 to 20 parts of a first hydroxyl compound and 0.10 to 20 parts of a second hydroxyl compound different from said first hydroxyl compound, said hydroxyl compounds being selected from the group consisting of alkane diols and triols; with
B. a quasi prepolymer of an alkane diol and an MDI, said quasi prepolymer having a free NCO in the range of 22 to 24 percent;
wherein:
said long chain polyol has a molecular weight in the range of 3000 to 6000, a functionality in the range of 2 to 3, and an equivalent weight of 1500 to 3000;
all of said alkane diols and triols have a molecular weight in the range of 62 to 250;
said aromatic polyamine has the formula

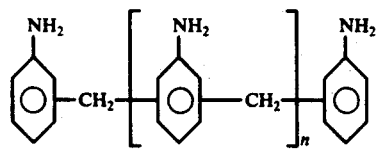

and n has a value in the range of 0.1 to 0.7.

4. The form of claim 3 wherein said alkane diols and triols are selected from the group consisting of butane diols, ethylene glycol, diethylene glycol, pentane diol, trimethyol propane, and hexane triol.

5. A method of making a thin-sectioned component of a polyurethane high density foam comprising injecting via a RIM machine into a mold cavity of the desired configuration a highly reactive quasi prepolymer foam formulation, allowing said formulation to cure in said mold cavity, and demolding the molded article in less than two minutes from the time of injection, said formulation being:
A. a polyol blend comprising (parts by weight):

| long chain polyol | 50 to 100 |
| cross linker/extender | 0 to 25 |
| aromatic polyamine | 1 to 6 |
| alkylene amine catalyst | 0.01 to 3.0 |
| organometal catalyst | 0.01 to 0.05 | with
B. a quasi prepolymer of an alkane diol and an aromatic diisocyanate, said quasi prepolymer having a FNCO in the range of 20 to 27 percent;
wherein:
said long chain polyol has a molecular weight in the range of 3000 to 6000, a functionality in the range of 2 to 3, and an equivalent weight of 1500 to 3000,
said crosslinker/extender has a molecular weight in the range of 62 to 250 and is selected from the group consisting of alkane diols and triols,
said aromatic polyamine has the formula

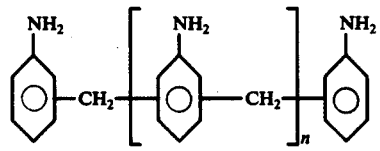

and n has a value in the range of 0.1 to 0.7; and said polyol blend and said quasi prepolymer are admixed to an Index in the range of 98 to 106.

6. A method of making a thin-sectioned automobile trim component of a polyurethane high density foam comprising injecting via a RIM machine providing a time from initial mixing to injection of less than 0.01 seconds into a mold cavity of the desired configuration a highly reactive quasi prepolymer foam formulation, allowing said formulation to cure in said mold cavity, and demolding the molded article in less than one minute from the time of injection, said formulation being
A. a polyol blend comprising (parts by weight):

| long chain polyol | 70 to 90 |
| [alkane diol/ triol #1 | 10 to 20] |
| [alkane diol/triol #2 | 0.10 to 20] |
| aromatic polyamine | 3 to 4 |
| alkylene amine catalyst | 0.015 to 0.030 |
| carbon black | 0.01 to 1.0 |
| gaseous blowing agent | 3 to 8 | and a crosslinker/extender blend comprising in the range of 10 to 20 parts of a first hydroxyl compound and 0.10 to 20 parts of a second hydroxyl compound different from said first hydroxyl compound, said hydroxyl compounds being selected from the group consisting of alkane diols and triols; with
B. A quasi prepolymer of an alkane diol, and an MDI, said quasi prepolymer having a free NCO in the range of 22 to 24 percent;
wherein:
said long chain polyol has a molecular weight in the range of 3000 to 6000, a functionality in the range of 2 to 3, and an equivalent weight of 1500 to 3000;

all of said alkane diols and triols have a molecular weight in the range of 62 to 250;
said aromatic polyamine has the formula
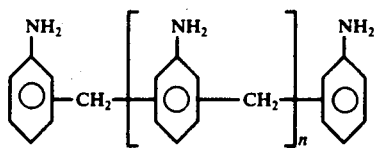
and $n$ has a value in the range of 0.1 to 0.7.

UNITED STATES PATENT OFFICE
CERTIFICATE OF CORRECTION

PATENT NO. : 4,048,105
DATED : September 13, 1977
INVENTOR(S) : Wayne C. Salisbury It is certified that error appears in the above-identified patent and that said Letters Patent are hereby corrected as shown below.

Column 1, line 27 before "functionality" insert --a--. Table 1, line 7 after "Catalyst #" insert --1--. Table 1, line 8 after "Catalyst #" insert --2--. Table 1, line 13 "Prepolymer" should be underlined. Columns 3 and 4, Table 1 continued, Item 1, line 3 "P-38Q" should be --P-380--. Columns 3 and 4, Table 1 continued, Item 6 "DuPOnt's" should be --DuPont's--. Columns 3 and 4, Table 1 continued, Item 7 "andpaintability" should be --and paintability--. Columns 3 and 4, Table 1 continued, Item 8, line 1 "byweight" should be --by weight--. Columns 3 and 4, Table 1 continued, Item 8, line 1 "alsobe" should be --also be--. Column 3, Notes:, Items 1 - 8 repeated, once in small print and once in large print. Column 5, Claim 3, Item A, lines 2 and 3 of table should be deleted. Column 6, Claim 6, Item A, lines 2 and 3 of table should be deleted.

Signed and Sealed this

Thirty-first Day of January 1978

[SEAL]

Attest:

RUTH C. MASON
Attesting Officer

LUTRELLE F. PARKER
Acting Commissioner of Patents and Trademarks